United States Patent
Koo et al.

(10) Patent No.: US 8,688,105 B2
(45) Date of Patent: Apr. 1, 2014

(54) METHOD FOR SETTING CONTROL MULTI POINT IN WIRELESS COMMUNICATION SYSTEM AND APPARATUS THEREOF

(75) Inventors: Ja Ho Koo, Gyeonggi-do (KR); Hyun Soo Ko, Gyeonggi-do (KR); Bin Chul Ihm, Gyeonggi-do (KR); Wook Bong Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 255 days.

(21) Appl. No.: 13/254,611

(22) PCT Filed: Jan. 21, 2010

(86) PCT No.: PCT/KR2010/000386
§ 371 (c)(1),
(2), (4) Date: Sep. 2, 2011

(87) PCT Pub. No.: WO2010/101352
PCT Pub. Date: Sep. 10, 2010

(65) Prior Publication Data
US 2012/0021738 A1    Jan. 26, 2012

Related U.S. Application Data

(60) Provisional application No. 61/157,212, filed on Mar. 4, 2009.

(30) Foreign Application Priority Data

Nov. 10, 2009  (KR) .................. 10-2009-0107951

(51) Int. Cl.
*H04W 4/00*    (2009.01)
(52) U.S. Cl.
USPC .................... 455/422.1; 455/561; 455/562.1

(58) Field of Classification Search
None
See application file for complete search history.

(56) References Cited

U.S. PATENT DOCUMENTS

| | | | |
|---|---|---|---|
| 2008/0233967 A1* | 9/2008 | Montojo et al. | 455/452.2 |
| 2009/0010149 A1 | 1/2009 | Lee et al. | |
| 2010/0027456 A1* | 2/2010 | Onggosanusi et al. | 370/312 |
| 2010/0099428 A1* | 4/2010 | Bhushan et al. | 455/452.1 |

FOREIGN PATENT DOCUMENTS

| | | |
|---|---|---|
| KR | 2007-0021917 | 2/2007 |
| KR | 2007-0112932 | 11/2007 |
| KR | 2008-0074419 | 8/2008 |
| KR | 2009-0077185 | 7/2009 |

OTHER PUBLICATIONS

International Search Report for PCT/KR2010/00386 (PCT corresponding to present application).

* cited by examiner

*Primary Examiner* — Suhail Khan
(74) *Attorney, Agent, or Firm* — Morgan, Lewis & Bockius LLP

(57) ABSTRACT

The present invention relates to a method for setting a control multi point of a serving cell in a wireless communication system. The serving cell selects more than one adjacent base station as a control multi point set based on first link information between terminals and the adjacent base stations received from the terminals. Furthermore, the serving cell: receives a pre-coding matrix index corresponding to the adjacent base stations which is selected by the terminals, selects more than one pre-coding matrix index from the received pre-coding matrix indexes according to a preset condition, generates a pre-coding matrix index list, and transmits pre-coding matrix index list to the corresponding base station.

2 Claims, 5 Drawing Sheets

METHOD FOR SETTING CONTROL MULTI POINT IN WIRELESS COMMUNICATION SYSTEM AND APPARATUS THEREOF

TECHNICAL FIELD

This application is a national stage application of PCT Application No. PCT/KR2010/000386, filed on Jan. 21, 2010, which claims the benefit of U.S. Provisional Application No. 61/157,212, filed on Mar. 4, 2009 and Korean Application Number 10-2009-0107951, filed on Nov. 10, 2009, the contents of which are both hereby incorporated by reference in their entirety as if fully set forth herein.

BACKGROUND ART

Multiple Input Multiple Output (MIMO) has recently attracted much attention as a broadband wireless mobile communication technology. A MIMO system seeks to increase data communication efficiency by use of a plurality of antennas. Depending on whether the same or different data signals are transmitted through antennas, MIMO techniques may be classified into spatial multiplexing and spatial diversity. In spatial multiplexing, different data signals are transmitted simultaneously through a plurality of Transmission (Tx) antennas such that data can be transmitted at a high rate without increasing a system bandwidth. In spatial diversity, the same data is transmitted through a plurality of Tx antennas, thus achieving transmit diversity. An example of the spatial diversity scheme is space time channel coding.

Depending on whether a receiver feeds back channel information to a transmitter, MIMO techniques may also be classified into open-loop MIMO and closed-loop MIMO. Open-loop MIMO schemes include Bell Labs Layered Space-Time (BLAST) and Space-Time Trellis Coding (STTC). According to BLAST, the transmitter transmits information in parallel and the receiver detects signals by repeating Zero Forcing (ZF) or Minimum Mean Square Error (MMSE) detection such that as much information as the number of Tx antennas can be transmitted. STTC achieves transmit diversity and coding gain by utilizing a space domain. One example of the closed-loop MIMO technique is Transmit Antenna Array (TxAA).

FIG. 1 conceptually illustrates a Coordinated Multi-Point (COMP) scheme of the conventional intra eNBs and inter eNBs.

Referring to FIG. 1, intra enhanced Node Bs (eNBs) 110 and 120 and an inter eNB 130 are present in a multi-cell environment. In a Long Term Evolution (LTE) system, an intra eNB covers a plurality of cells (or sectors). Cells covered by an eNB to which a User Equipment (UE) belongs are in an intra eNB relationship with the UE. That is, cells covered by the same eNB that manages a cell in which a UE is located are cells corresponding to the intra eNBs 110 and 120, and cells covered by a different eNB from the eNB that manages the serving cell of the UE are cells corresponding to the inter eNB 130.

Cells covered by the same eNB that serves a UE exchange information (e.g. data and Channel State Information (CSI)) through an x2 interface, while cells covered by a different eNB from the serving eNB of the UE exchange inter-cell information via a backhaul 140. As illustrated in FIG. 1, a single-cell MIMO user 150 located in a single cell (or sector) may communicate with one serving eNB in the cell (or sector), and a multi-cell MIMO user 160 located at a cell edge may communicate with a plurality of serving eNBs in a plurality of cells (or sectors).

CoMP has been proposed to improve the throughput of a user at a cell edge by applying advanced MIMO in a multi-cell environment. The use of CoMP may reduce Inter-Cell Interference (ICI) in the multi-cell environment. The use of CoMP also allows a UE to receive joint data support from multi-cell eNBs. Also, each eNB may improve system performance by simultaneously supporting one or more UEs (or Mobile Stations (MSs)) $MS_1, MS_2, \ldots, MS_K$ using the same radio frequency resources. Further, an eNB may implement Space Division Multiple Access (SDMA) based on CSIs between the eNB and UEs.

The CoMP operation mode may be classified into two modes, a joint processing mode which is cooperative MIMO based on data sharing and a Coordinated Scheduling/Beamforming (CS/CB) mode.

In a CoMP wireless communication system, a serving eNB and one or more cooperating eNBs (or Base Stations (BSs)) $BS_1, BS_2, \ldots, BS_M$ are connected to a scheduler over a backbone network. The scheduler receives feedback channel information representing channel states between the UEs $MS_1$ to $MS_K$ and the cooperating eNBs $BS_1, BS_2, \ldots, BS_M$, as measured by the eNBs. For example, the scheduler may schedule cooperative MIMO information for the serving eNB and the one or more cooperating eNBs. That is, the scheduler issues a command related to a cooperative MIMO operation directly to each eNB.

However, the current LTE system has not yet defined a method which is to be used for setting serving and neighbor eNBs, information which is to be exchanged, and the like in the case where a CoMP mode scheme is applied to a wireless communication system. In this case, system overload (or overhead) may occur if the serving eNB receives and processes information of all neighbor eNBs from UEs or if the serving eNB transmits all information received from UEs to neighbor eNBs and allows the neighbor eNBs to process all the information.

DISCLOSURE

Technical Problem

An object of the present invention devised to solve the problem lies in a method for setting a Coordinated Multi-Point (CoMP) set, wherein the amount of information transmitted to neighbor eNBs when setting the CoMP set is reduced to efficiently decrease overall system overhead.

Technical Solution

The object of the present invention can be achieved by providing a method for setting a Coordinated Multi-Point (CoMP) set of a serving enhanced Node B (eNB) in a wireless communication system, the method including receiving first associated information between neighbor eNBs and User Equipments (UEs) from the UEs, selecting one or more neighbor eNBs from among the neighbor eNBs as a CoMP set based on the first associated information, receiving precoding matrix indices corresponding respectively to the selected neighbor eNBs from the UEs, selecting one or more precoding matrix indices from among the received precoding matrix indices according to a preset condition and generating a precoding matrix index list including the selected precoding matrix indices, and transmitting the precoding matrix index list to a corresponding neighbor eNB.

Preferably, selecting the one or more precoding matrix indices according to the preset condition includes selecting one or more precoding matrix indices whose reception frequencies are equal to or greater than a threshold from among the received precoding matrix indices.

Preferably, the method further includes receiving, by the serving eNB, second associated information between the selected neighbor eNBs and the UEs from the UEs at regular intervals or irregular intervals. Preferably, transmitting the precoding matrix index list from the serving eNB to the corresponding neighbor eNB includes transmitting second associated information of the corresponding neighbor eNB together with the precoding matrix index list.

More preferably, transmitting the precoding matrix index list from the serving eNB to the corresponding neighbor eNB includes transmitting an average of first associated information and second associated information of the corresponding neighbor eNB together with the precoding matrix index list.

In another aspect of the present invention, provided herein is an enhanced Node B (eNB) apparatus in a wireless communication system, the eNB apparatus including a reception module for receiving precoding matrix indices and first associated information items of neighbor eNBs from UEs, a processor including a Coordinated Multi-Point (COMP) selection module for selecting one or more neighbor eNBs to be included in a CoMP set from among the neighbor eNBs using the received first associated information items and a precoding matrix index list generation module for selecting one or more precoding matrix indices from among the received precoding matrix indices according to a preset condition and generating a precoding matrix index list including the selected precoding matrix indices, and a transmission module for transmitting information of the selected neighbor eNBs to the UEs and transmitting the precoding matrix index list to a corresponding neighbor eNB.

Preferably, selecting the one or more precoding matrix indices according to the preset condition includes selecting one or more precoding matrix indices whose reception frequencies are equal to or greater than a threshold from among the received precoding matrix indices.

More preferably, the reception module receives second associated information between the selected neighbor eNBs and the UEs from the UEs at regular intervals or irregular intervals, the processor obtains an average of first associated information and second associated information of the corresponding neighbor eNB, and the transmission module transmits the average together with the precoding matrix index list to the corresponding neighbor eNB.

Advantageous Effects

In the CoMP set setting method according to the present invention, neighbor eNBs which have a direct influence upon UEs may be set as a CoMP set, thereby achieving high flexibility in CoMP set setting. In addition, the serving eNB may select and transmit precoding matrix indices to neighbor eNBs, thereby reducing overload (or overhead) of the neighbor eNBs.

BEST MODE

Figure 1:
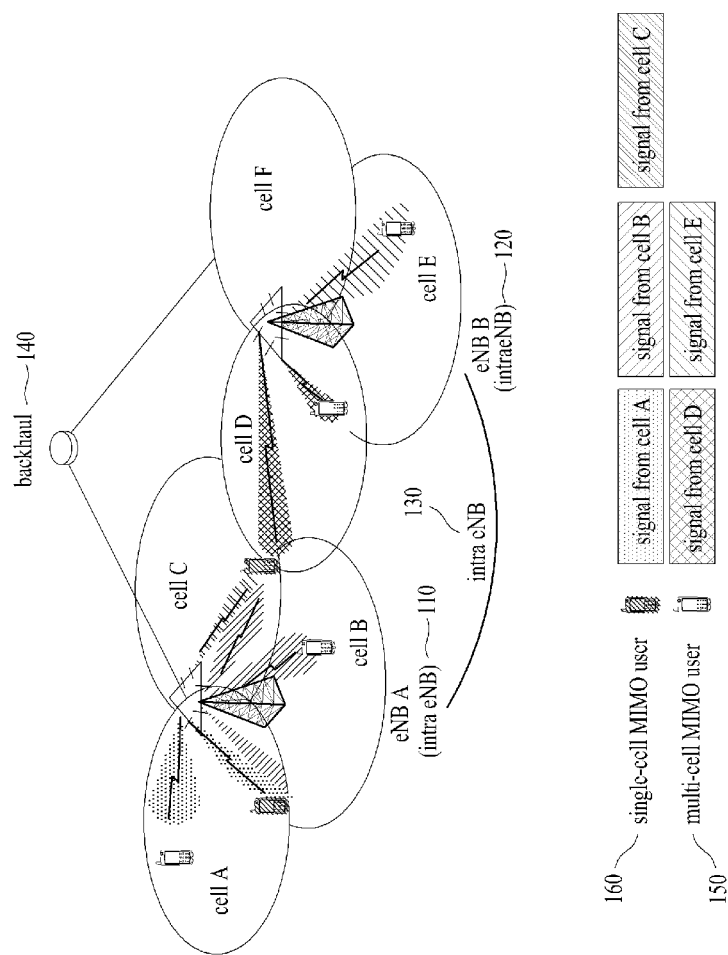
FIG. 1 conceptually illustrates a Coordinated Multi-Point (CoMP) scheme of the conventional intra eNBs and inter eNBs.

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. The same reference numbers will be used throughout this specification to refer to the same or like parts.

It should be noted that the terms and words used in the present specification and claims should not be construed as being limited to common or dictionary meanings but instead should be understood to have meanings and concepts in agreement with the spirit of the present invention based on the principle that an inventor can define the concept of each term suitably in order to describe his/her own invention in the best way possible.

According to the present invention, the term "cell" or "sector" refers to a space that is under control of an enhanced Node B (eNB). Although the present invention will be described with reference to an example in which each eNB controls one cell or sector for ease of explanation, the present invention is not necessarily limited to this example and each eNB may control a plurality of cells or sectors.

In the present invention, the term "CoMP set" refers to a set of serving and neighbor eNBs that operate in a CoMP mode in a wireless communication system.

In addition, the term "associated information" or "associated information item" refers to information regarding the level of interference from a neighbor eNB which has an influence upon communication between UEs and the serving eNB.

Also, the term "precoding matrix index list" refers to a set of precoding matrix indices that the serving eNB has selected from among given precoding matrix indices according to a preset condition.

To efficiently apply a CoMP mode scheme to a wireless communication system, there is a need to clearly define a method for measuring information such as a channel state, a precoding matrix index, and an interference level, a method for transmitting and receiving the measured information, and the like. That is, there is a need to define measurement procedures when setting a CoMP set and operation procedures using the same to enable efficient operation in the CoMP mode scheme.

Methods of selecting neighbor eNBs to be included in a CoMP set may include a method in which neighbor eNBs are selected based on information measured in UEs and a method in which the serving eNB internally selects neighbor eNBs without exchanging information with UEs. The method in which neighbor eNBs are selected based on information measured in UEs has an advantage over the method in which the serving eNB internally selects neighbor eNBs in that it is possible to achieve flexibility in CoMP set setting since neighbor eNBs which actually have a direct influence upon UEs can be included in the CoMP set. CoMP set setting methods of the present invention described below are associated with the neighbor eNB selection method in which neighbor eNBs to be included in a CoMP set are selected based on information measured in UEs.

Figure 2:
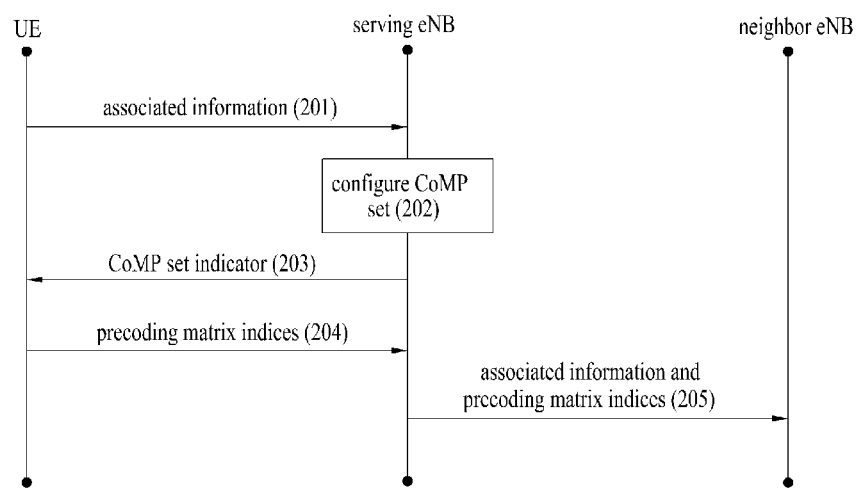
FIG. 2 is a flowchart illustrating a method for setting a CoMP set according to one embodiment of the present invention.

FIG. 2 is a flowchart illustrating a method for setting a CoMP set according to an embodiment of the present invention.

First of all, UEs need to have a list of neighbor eNBs. To accomplish this, the UEs receive a neighbor eNB list from their serving eNB or generate a neighbor eNB list through measurements of neighbor eNBs. Then, the UEs perform measurements according to the neighbor eNB list. Specifically, the UEs measure associated information of the neighbor eNBs such as their interference levels. The associated information may include at least one of the values listed in Table 1.

TABLE 1

1  RSRP (Reference Symbol Received Power) of neighbor eNB
2  RSRQ (Reference Symbol Received Quality) of neighbor eNB
3  RSSI(Reference Signal Strength Indicator) of neighbor eNB
4  CINR (Carrier to Interference plus Noise Ratio) or SINR (Signal to Interference Noise Ratio) of neighbor eNB, when recommended PMI is applied to or restricted PMI is excluded for neighbor eNB
5  PD(Propagation Delay) from neighbor eNB
6  Improved CINR or SINR of serving eNB, when recommended PMI is applied to neighbor eNB or when restricted PMI is excluded for neighbor eNB Referring to FIG. 2, the UEs report associated information required to configure a CoMP set to the serving eNB in step 201. The associated information may include one or more measurements among the measurements of neighbor eNBs described above and the Identifications (IDs) (or cell IDs) of the neighbor eNBs.

In the case where the serving eNB has previously provided the neighbor eNB list to the UEs, the UEs may transmit associated information of the neighbor eNBs in the order of predefined eNB IDs or may transmit indices and associated information of the eNB IDs or may arrange index information of the eNB IDs in order of the size of the associated information, i.e., in the order of the interference level and transmit such arranged index information to the serving eNB.

Subsequently, in step 202, the serving eNB selects one or more neighbor eNBs that are to be included in the CoMP set according to a predetermined condition using the associated information and IDs of the eNBs received in step 201.

After the procedure for selecting eNBs to be included in the CoMP set is terminated, the selected neighbor eNBs need to perform a precoding matrix selection procedure according to a CoMP mode that is to be performed. That is, one neighbor eNB may be selected to be included in one or more CoMP sets and one or more serving eNBs may transmit a plurality of precoding matrix indices to the neighbor eNB, requesting the neighbor eNB to select one of the plurality of precoding matrix indices. The following is a more detailed description of the precoding matrix selection procedure.

The serving eNB transmits information regarding the one or more selected neighbor eNBs to the UE in step 203. That is, the serving eNB transmits eNB IDs of the neighbor eNBs selected in step 202 to the UE to allow the UE to determine which neighbor eNBs are included in the CoMP set.

In step 204, the UEs measure precoding matrix indices corresponding respectively to the neighbor eNBs included in the CoMP set and transmit the measured precoding matrix indices to the serving eNB.

In step 205, the serving eNB transmits, to each neighbor eNB included in the CoMP set, all precoding matrix indices that each UE has measured for the neighbor eNB without any internal selection procedure. That is, the serving eNB forwards the precoding matrix indices to the neighbor eNBs. In this case, it is preferable that the serving eNB transmit associated information, i.e., interference level information, received from the UE in step 201 in addition to the precoding matrix indices.

On the other hand, a neighbor eNB included in a CoMP set may be included in a different CoMP set and may receive precoding matrix indices or precoding matrix indices together with associated information items from a serving eNB of the different CoMP set. Accordingly, the neighbor eNB which has received precoding matrix indices or precoding matrix indices together with associated information items from one or more serving eNBs performs a procedure for determining a precoding matrix index that is to be applied or to be restricted for use when actually transmitting signals. The following is a more detailed description of this procedure.

The neighbor eNB which has received the precoding matrix indices and the associated information may select a precoding matrix index based on the frequency of each precoding matrix index. The neighbor eNB may also select a precoding matrix index based on interference level information together with the frequency of reception of each precoding matrix index.

For example, let us assume that neighbor eNB 2 is included in both a first CoMP set of serving eNB 1 and a second CoMP set of serving eNB 2. In addition, let us assume that UEs 1_1, 2_1, and 3_1, which are under control of the serving eNB 1, have transmitted, to the serving eNB 1, precoding matrix index 1, precoding matrix index 2, and precoding matrix index 1 respectively as a precoding matrix index that is recommended for the neighbor eNB 2 or is restricted for use by the neighbor eNB 2 and UEs 1_3, 2_3, and 3_3, which are under control of the serving eNB 3, have transmitted, to the serving eNB 3, precoding matrix index 2, precoding matrix index 3, and precoding matrix index 2 respectively as a precoding matrix index that is recommended for the neighbor eNB 2 or is restricted for use by the neighbor eNB 2.

In this embodiment, both the serving eNB 1 and the serving eNB 3 forward precoding matrix indices received from UEs to the neighbor eNB 2 without any internal selection procedure. In this case, it is preferable that the serving eNB 1 and the serving eNB 3 transmit associated information, i.e., interference level information, in addition to the precoding matrix indices.

The neighbor eNB 2 may select or exclude the most frequent precoding matrix index among the received precoding matrix indices. On the other hand, in the case where the frequencies of all received precoding matrix indices are equal, the neighbor eNB 2 may select or exclude a precoding matrix index which is the most seriously affected by interference according to a preset condition using the associated information.

However, in the case where the serving eNB transmits, to the neighbor eNB, all precoding matrix indices or all precoding matrix indices together with associated information received from UEs, there is a problem in that the complexity or overhead of information transmission and reception through a backhaul may be significantly increased. The following is a description of an improved method for setting a CoMP set to solve this problem.

Figure 3:
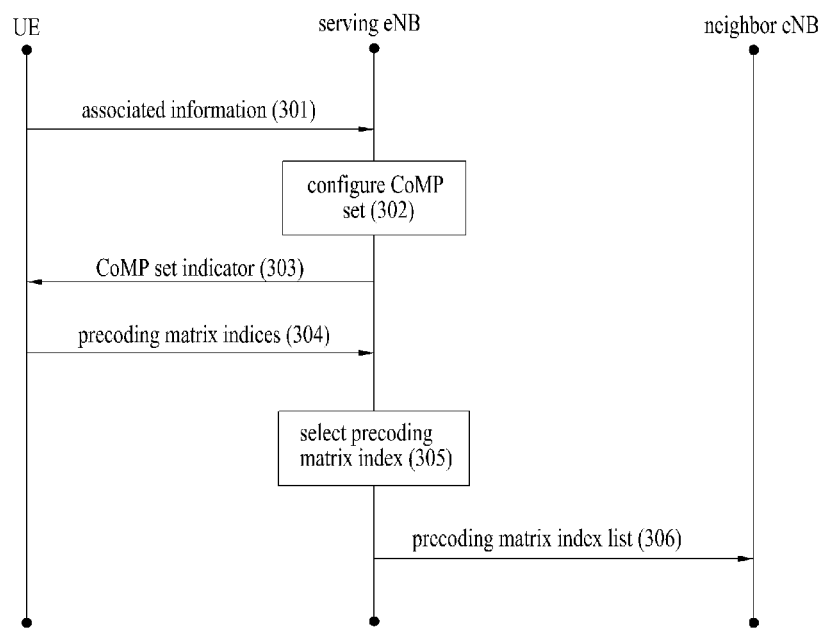
FIG. 3 is a flowchart illustrating a method for setting a CoMP set according to another embodiment of the present invention.

FIG. 3 is a flowchart illustrating a method for setting a CoMP set according to another embodiment of the present invention.

A detailed description of steps 301 to 304 of FIG. 3 is omitted herein since steps 301 to 304 are similar to steps 201 to 204 of FIG. 2 described above.

When the serving eNB has received precoding matrix indices corresponding respectively to neighbor eNBs included in the CoMP set from UEs, the serving eNB performs a first selection procedure in step 305. That is, the serving eNB selects precoding matrix indices to be transmitted to the neighbor eNBs using the frequencies of precoding matrix indices corresponding to the neighbor eNBs and associated information (i.e., interference level information) in the case where the precoding matrix indices are applied and generates a precoding matrix index list including the selected precoding matrix indices.

Subsequently, in step 306, the serving eNB transmits the precoding matrix index list generated in the first selection procedure in step 305 to each neighbor eNB included in the CoMP set. The neighbor eNB performs a second selection procedure which determines a precoding matrix index to be actually applied using the precoding matrix index list. The following is a more detailed description of this procedure.

First, similar to the embodiment of FIG. 2, let us assume that neighbor eNB 2 is included in both a first CoMP set of serving eNB 1 and a second CoMP set of serving eNB 2. In addition, let us assume that UEs 1_1, 2_1, and 3_1, which are under control of the serving eNB 1, have transmitted, to the serving eNB 1, precoding matrix index 1, precoding matrix index 2, and precoding matrix index 1 respectively as a precoding matrix index that is recommended for the neighbor eNB 2 or is restricted for use by the neighbor eNB 2 and UEs 1_3, 2_3, and 3_3, which are under control of the serving eNB 3, have transmitted, to the serving eNB 3, precoding matrix index 2, precoding matrix index 3, and precoding matrix index respectively as a precoding matrix index that is recommended for the neighbor eNB 2 or is restricted for use by the neighbor eNB 2.

Unlike the embodiment of FIG. 2, each of the serving eNB 1 and the serving eNB 3 performs a first selection procedure which selects a precoding matrix index to be transmitted to the corresponding neighbor eNB. That is, the serving eNB selects one of the precoding matrix index 1 and the precoding matrix index 2 based on the frequencies of reception and the associated information of precoding matrix indices and transmits the selected precoding matrix index to the neighbor eNB 2 and the serving eNB 3 selects one of the precoding matrix index 2 and the precoding matrix index 3 and transmits the selected precoding matrix index to the neighbor eNB 2 in the same manner.

The neighbor eNB 2 performs a second selection procedure in which the neighbor eNB 2 determines a precoding matrix index to be applied or to be restricted for use when actual signal transmission is performed based on the frequencies of reception of precoding matrix indices from one or more serving eNBs.

However, the method of the embodiment of FIG. 3, in which only precoding matrix indices are transmitted to the neighbor eNBs, may provide probabilistically inaccurate results when the number of UEs present at cell boundaries is small and may also cause a problem in determining a precoding matrix index to be actually applied or restricted for use, for example, when the frequencies of precoding matrix indices transmitted to the neighbor eNBs are equal. Accordingly, the present invention suggests a method in which the serving eNB transmit associated information together with precoding matrix indices to the corresponding neighbor eNB.

Figure 4:
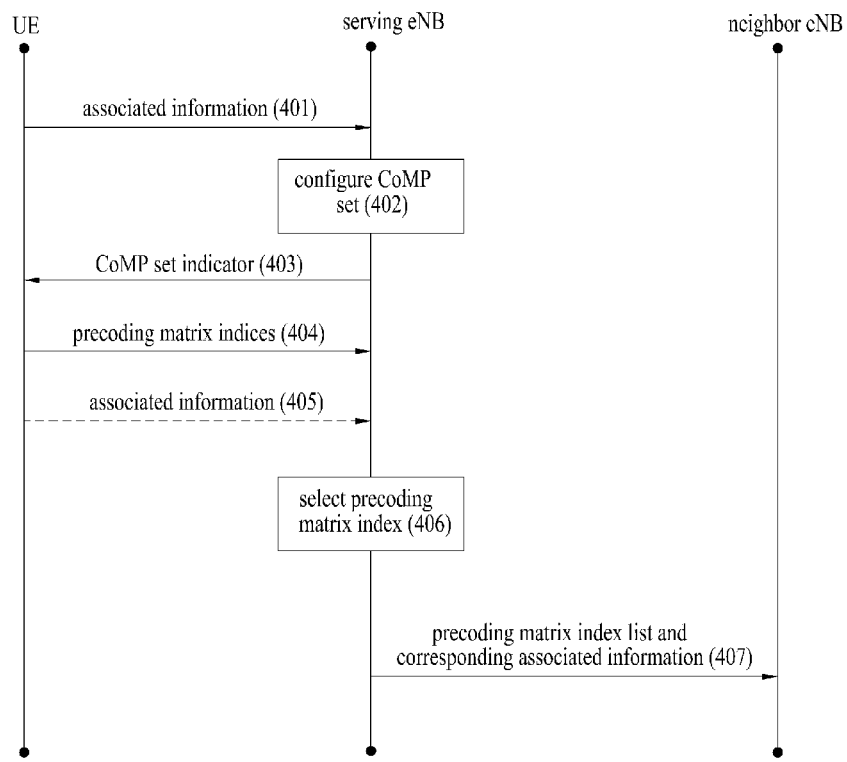
FIG. 4 is a flowchart illustrating a procedure for setting a CoMP set according to another embodiment of the present invention.

FIG. 4 is a flowchart illustrating a procedure for setting a CoMP set according to another embodiment of the present invention.

A detailed description of steps 401 to 404 of FIG. 4 is also omitted herein since steps 401 to 404 are similar to steps 201 to 204 of FIG. 2 described above.

Associated information that the serving eNB has received when configuring a CoMP set in step 401 does not correctly reflect interference level that varies with time. Accordingly, UEs may transmit associated information such as interference level at regular intervals or at irregular intervals or at the request of the serving eNB in step 405 and the serving eNB may update the associated information with that received from the UEs when configuring a CoMP set. However, the process of step 405 may be omitted when it is determined that feedback overhead of the serving eNB is excessive.

The serving eNB may obtain a statistical value of the associated information updated in step 405 or the associated information received in step 401 in order to reduce overhead by reducing the amount of associated information transmitted to the neighbor eNBs. Here, the obtained statistical value may be the average, sum, maximum, minimum, variance, or standard deviation of the associated information.

Then, in step 406, the serving eNB performs a first selection procedure which selects precoding matrix indices. That is, the serving eNB selects precoding matrix indices to be transmitted to the neighbor eNBs using both the frequencies of precoding matrix indices corresponding to the neighbor eNBs and the updated associated information and generates a precoding matrix index list including the selected precoding matrix indices. For example, even when a precoding matrix index has the highest frequency of reception, the serving eNB selects the precoding matrix index as a precoding matrix index to be transmitted to the neighbor eNB only when the statistical value of the precoding matrix index is equal to or greater than a threshold.

Then, in step 407, the serving eNB transmits both the precoding matrix index list generated in the first selection procedure of step 406 and associated information items updated in step 405 to the each neighbor eNB included in the CoMP set. More preferably, instead of transmitting all updated associated information items, the serving eNB may transmit a statistical value of the updated associated information items. In this case, the transmission period of the precoding matrix index list and the transmission period of the updated associated information may be equal or different.

Each neighbor eNB performs a second selection procedure which determines a precoding matrix index to be actually applied using the precoding matrix index list and the associated information (preferably, the statistical value thereof). That is, even when the neighbor eNB has received precoding matrix indices whose reception frequencies are equal, the neighbor eNB may select a more effective precoding matrix index from among the precoding matrix indices using the updated associated information or statistical value.

Figure 5:
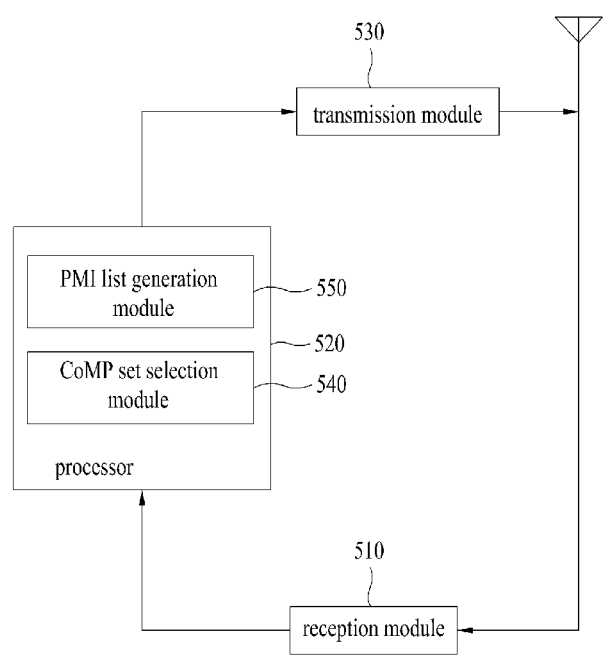
FIG. 5 is a block diagram of an eNB apparatus according to an embodiment of the present invention.

FIG. 5 is a block diagram of an eNB apparatus according to an embodiment of the present invention.

As shown in FIG. 5, the eNB apparatus includes a reception module 510, a processor 520, and a transmission module 530 and may further include a CoMP set selection module 540 and a precoding matrix index (PMI) list generation module 550.

The reception module 510 may receive precoding matrix indices and associated information, i.e., interference level information, in addition to general data transmitted from a UE or another eNB.

The processor 520 controls overall operation of the eNB apparatus and may generate a list of neighbor eNBs and transmit the list through the transmission module 530. The processor 520 may obtain a statistical value (such as an average, sum, maximum, or minimum) of associated information items received at regular or irregular intervals.

The CoMP set selection module 540 included in the processor 520 may select one or more neighbor eNBs as neighbor eNBs to be included in the CoMP set using associated information items received from UEs and may transmit the selected neighbor eNB list to the UEs through the transmission module 530.

The PMI list generation module 550 included in the processor 520 may select one or more precoding matrix indices from among the received precoding matrix indices according to a preset condition and generate a precoding matrix index list including the selected precoding matrix indices. Precoding matrix index selection according to the preset condition may include selecting precoding matrix indices whose reception frequencies are equal to or greater than a threshold or selecting a precoding matrix index which has the highest reception frequency. Precoding matrix index selection according to the preset condition may also include selecting precoding matrix indices whose associated information values are equal to or greater than a threshold.

The transmission module 530 may transmit a precoding matrix index list to another eNB and may preferably transmit a statistical value of associated information items obtained by the processor 520 together with the precoding matrix index list.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may combine the structures described in the above embodiments in a variety of ways.

Accordingly, the invention should not be limited to the specific embodiments described herein, but should be accorded the broadest scope consistent with the principles and novel features disclosed herein.

INDUSTRIAL APPLICABILITY

A method and apparatus for setting a CoMP set described above is applicable to various mobile communication systems that may employ an eNB cooperative communication scheme.

The invention claimed is:

1. A method for setting a Coordinated Multi-Point (CoMP) set of a serving enhanced Node B (eNB) in a wireless communication system, the method comprising:
    receiving first associated information between neighbor eNBs and User Equipments (UEs) from the UEs;
    selecting one or more neighbor eNBs from among the neighbor eNBs as a CoMP set based on the first associated information;
    receiving precoding matrix indices corresponding respectively to the selected neighbor eNBs from the UEs;
    receiving second associated information between the selected neighbor eNBs and the UEs from the UEs at irregular intervals;
    selecting one or more precoding matrix indices from among the received precoding matrix indices according to a preset condition and generating a precoding matrix index list including the selected precoding matrix indices and obtaining an average value of the first associated information and the second associated information of a corresponding neighbor eNB, wherein the preset condition indicates that reception frequencies are equal to or greater than a threshold; and
    transmitting the precoding matrix index list and the average value of the first associated information and the second associated information to the corresponding neighbor eNB.

2. An enhanced Node B (eNB) apparatus in a wireless communication system, the eNB apparatus comprising:
    a reception module for receiving precoding matrix indices and first associated information items of neighbor eNBs from UEs and receiving second associated information between selected neighbor eNBs and the UEs from the UEs at irregular intervals;
    a processor including a Coordinated Multi-Point (CoMP) selection module for selecting one or more neighbor eNBs to be included in a CoMP set from among the neighbor eNBs using the received first associated information items, and a precoding matrix index list generation module for selecting one or more precoding matrix indices from among the received precoding matrix indices according to a preset condition, generating a precoding matrix index list including the selected precoding matrix indices, and obtaining an average value of the first associated information and the second associated information of a corresponding neighbor eNB; and
    a transmission module for transmitting information of the selected neighbor eNBs to the UEs and transmitting the precoding matrix index list and the average value of the first associated information and the second associated information to the corresponding neighbor eNB,
    wherein the preset condition indicates that reception frequencies are equal to or greater than a threshold.

* * * * *